United States Patent [19]

Mukherjee

[11] 4,424,668

[45] Jan. 10, 1984

[54] COMBINED GAS TURBINE AND STEAM TURBINE POWER STATION

[75] Inventor: Dilip Mukherjee, Fislisbach, Switzerland

[73] Assignee: BBC Brown, Boveri & Company Limited, Baden, Switzerland

[21] Appl. No.: 356,728

[22] Filed: Mar. 10, 1982

[30] Foreign Application Priority Data

Apr. 3, 1981 [CH] Switzerland .................. 2271/81

[51] Int. Cl.³ ............................................. F02C 6/18
[52] U.S. Cl. ................................. 60/39.182; 415/114
[58] Field of Search .................... 60/39.182, 39.19; 415/114

[56] References Cited

U.S. PATENT DOCUMENTS

| | | | |
|---|---|---|---|
| 1,901,873 | 3/1933 | Holzwarth | 60/39.182 |
| 2,403,388 | 7/1946 | Morey et al. | 60/39.19 |
| 4,314,442 | 2/1982 | Rice | 60/39.182 |
| 4,333,309 | 6/1982 | Coronel | 60/39.182 |

Primary Examiner—Louis J. Casaregola
Attorney, Agent, or Firm—Oblon, Fisher, Spivak, Mcclelland & Maier

[57] ABSTRACT

In order to operate a gas turbine and steam turbine plant with a high temperature at the inlet to the gas turbine plant, the parts located in the hot-gas stream of the gas turbine being steam-cooled, and the cooling steam, thereby raised to a higher temperature, being fed to the steam turbine for further expansion, it is proposed that the waste heat from the gas turbine (3) be led through a two-pressure waste heat boiler (7), and that the steam, generated in this boiler, be slightly superheated in a cooling-steam superheater (10), and fed to the hollow inlet vanes (43) and to the rotor blades (42), which are likewise hollow, the steam, strongly superheated during this cooling process, then being admixed to the steam coming from the intermediate superheater (13), and being fed to the low-pressure section of the steam turbine (27).

6 Claims, 4 Drawing Figures

COMBINED GAS TURBINE AND STEAM TURBINE POWER STATION

The present invention relates to a combined gas turbine and steam turbine power station with steam-cooled gas turbine components, in which power station the cooling steam is generated outside the gas turbine, in a waste heat boiler.

Power plants have already been disclosed, in which steam is used for cooling the gas turbine, this steam being generated by heat-exchange with the exhaust gases from the gas turbine, and being fed to the turbine blading in a manner such that the cooling steam in the working-substance channel flows around the turbine blading and thereby screens the rotor, with the blade-roots, and the casing from the hot gases. After flowing through the turbine, the cooling steam is collected, separately from the working gas, and is fed to a steam turbine (Swiss Patent Specification No. 364,656).

The non-uniform cooling of the root portion of the rotor blades must be regarded as one disadvantage of this arrangement, while a second disadvantage resides in the fact that it is very difficult to achieve a clean separation of the working medium from the cooling steam after both have passed through the turbine. The non-uniform cooling must be attributed, in particular, to the fact that the cooling steam, which is considerably cooler than the working substance, is fed in within the inner annular zone of the inflow channel, while the considerably hotter working substance flows at the outer annular zone.

The object of the present invention is to produce a combined gas turbine and steam turbine plant, in which the gas turbine is operated at a high inlet temperature, and the parts which are situated in the hot gas stream of the turbine are steam-cooled, the cooling steam being further expanded in a steam turbine, and it being possible to obtain a high plant efficieny by using an intermediate superheating stage in the steam-generator.

The abovementioned object is achieved, according to the invention, by means of the characterizing features of claim 1.

The advantage of the arrangement according to the invention is to be seen, in particular, in the fact that the use of two-pressure waste heat boiler, with intermediate superheating, enables the waste heat from the gas turbine to be utilized in a particularly effective manner, the cooling steam, thus obtained, being fed to the gas turbine, where, after having been forced to flow through the casing and the hollow guide vanes, and in a flow through the rotor and the hollow rotor blades, separated from the casing and guide-vane flow, it cools these parts, while these gas turbine components simultaneously serve as a superheater for a portion of the steam flowing through the system. As a result of this, it is possible to admix this stream of steam leaving the gas turbine, to the steam which has been partially expanded in the high-pressure section of the steam turbine and reheated in the intermediate superheater, and for this stream of steam to be led into the low-pressure section of the steam turbine, without any need for further reheating in the intermediate superheater. This procedure results in an optimum utilization value.

In accordance with claim 2, at least 40% of the total quantity of working substance is used for purposes relating to the cooling of the gas turbine.

Since, after being heated up in the gas turbine, this quantity of cooling steam is available for useful work in the low-pressure section of the steam turbine, virtually no loss, of power and/or of steam, occurs.

Further embodiments of the subject of the invention are evident from claims 3 to 6.

The arrangement of barrier-air passages, separated from the steam flow, enables air, taken from the compressor, to be fed in, from the inlet side of the turbine, parallel to the steam flow. Since a slight overpressure, relative to the hot gas duct, preferably prevails in these barrier air passages, air can flow over into this duct, at a low rate, as a result of which a barrier effect is obtained. A special advantage of this arrangement is also to be seen in the fact that, due to the comparatively low rates at which the barrier air need flow in order to exclude the hot gas from the rotor and bladecarrier, the high cooling air flow-rate, which would otherwise be required, is unnecessary, so that the elimination of the additional compressor capacity, needed for this purpose, results in a higher gas turbine output being available as useful power.

The arrangement of steam passages in the rotor and stator, which communicate with the cooling steam passages in the blades, and in the thermal-barrier segments, results in uniform cooling of all the parts around which the hot working substance flows.

An illustrative embodiment of a combi-plant, according to the invention, is represented in the drawing, in which.

Figure 1:
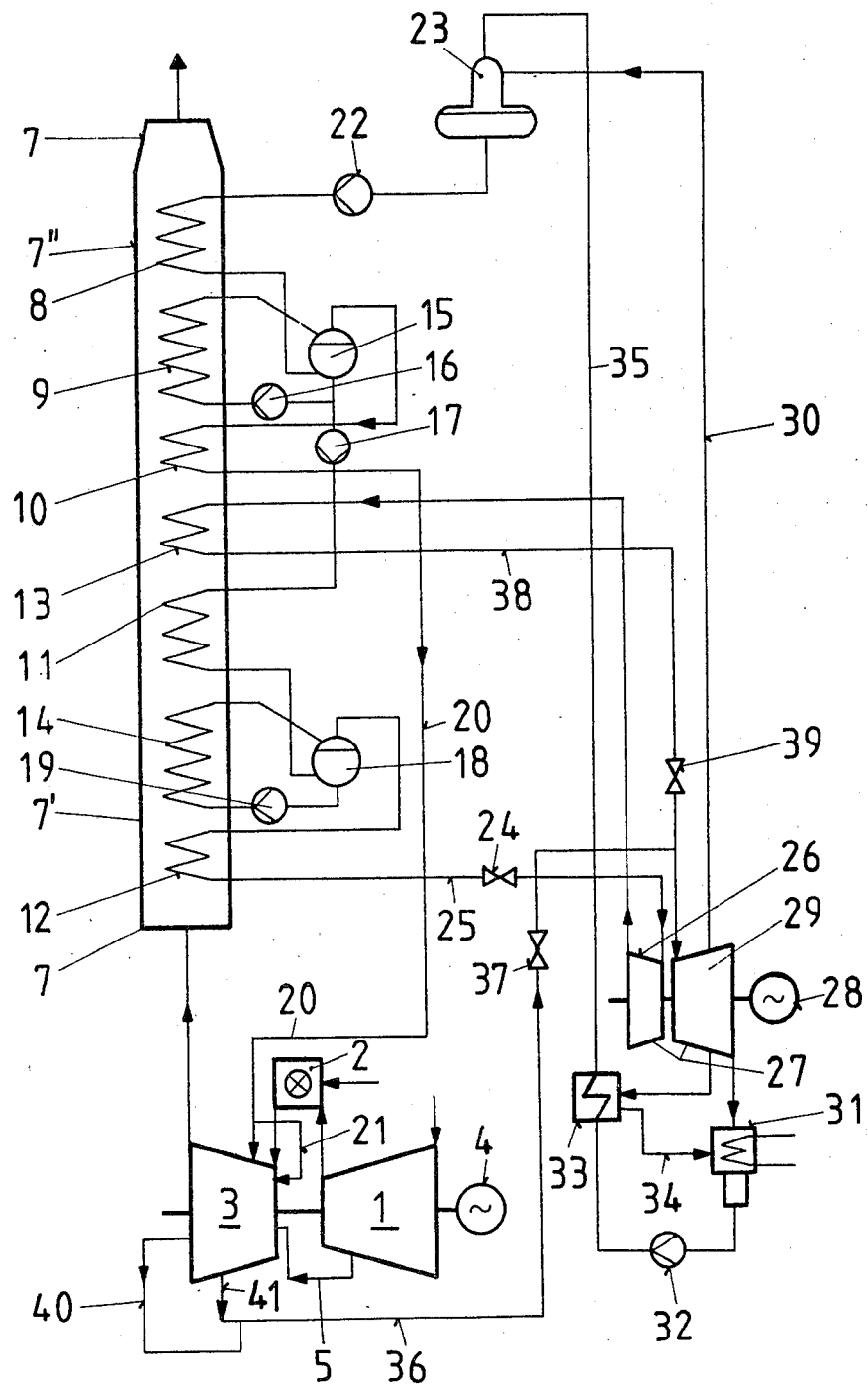
FIG. 1 shows a diagrammatic representation of a combi-plant.

According to FIG. 1, a waste heat boiler 7 is connected, in a combined gas turbine and steam turbine plant, according to the invention, downstream of a gas turbine which comprises a compressor 1, a combustion chamber 2, and a turbine 3, and which drives a generator 4, this waste heat boiler 7 possessing a high-pressure section 7' and a low-pressure section 7''. The gas turbine 1, 2, 3 is operated at a high inlet temperature, of approximately 1200° C., on account of which the rotor, stator and blading of the turbine 3 are cooled by means of steam. In the waste heat boiler 7, the exhaust gases from the tubine flow through the high-pressure and low-pressure sections (7' and 7''), located therein, one behind the other in the direction of flow, and leave the waste heat boiler 7 at a temperature of approximately 170° C. The high-pressure section 7' of the waste heat boiler 7 includes (in the direction in which the exhaust gases flow in) a high-pressure superheater 12, a high-pressure evaporator 14, a high-pressure preheater 11, and an intermediate superheater 13. In the low-pressure section 7'' of the waste heat boiler 7, there are arranged, again in the flow direction of the exhaust gases, a cooling steam superheater 10, a low-pressure evaporator 9, and a low-pressure preheater 8.

The live steam, which has been superheated in the high-pressure superheater 12, passes, via a live steam line 25, which is provided with a valve 24, through a high-pressure turbine 26 and, via the intermediate superheater 13, into a low-pressure turbine 29 of a steam turbine 27, which drives a generator 28 having an output of approximately 325 MW. The steam is expanded in the steam turbine 27, bleed steam being taken from the low-pressure stage 29, and being supplied, via a bleed line 30, to a feed-water reservoir 23, in order to heat this reservoir. The completely expanded steam leaving the steam turbine 27 passes, via a condenser 31 and a condensate pump 32, into a preheater 33, which is heated by bleed steam from the steam turbine 27, via a bleed line 34, and passes, via a return line 35, into the feed-water reservoir 23.

From the feed-water reservoir 23, boiler feed-water is fed, by a feed pump 22, to the low-pressure economizer 8, where it is preheated, and is then led into a low-pressure drum 15. A portion of the contents of the drum passes, via the circulating pump 16, into the low-pressure evaporator 9 of the waste heat boiler 7, and is led back into the drum 15 in the form of steam. This portion of steam is slightly superheated, according to the invention, in the cooling steam superheater 10, which is located, on the exhaust gas side, between the high-pressure preheater 11 and the low-pressure evaporator 9, and is then fed to the gas turbine for cooling purposes. The other portion of the contents of the drum is conveyed, by means of a high-pressure pump 17 and via the high-pressure economizer 11, into a high-pressure drum 18. The working substance enters the high-pressure evaporator 14, via a circulating pump 19, and passes back into the high-pressure drum 18. From the drum 18, the high-pressure steam passes to the steam turbine 27, via the high-pressure superheater 12 and the live steam line 25.

The cooling steam, slightly superheated in the cooling steam superheater, passes, via a cooling steam line 20, into the gas turbine 3, where it is heated up to approximately 450° C. as it flows through the parts around which the hot gas is flowing so that it has approximately the same temperature as the steam in a steam supply line 38, coming from the intermediate superheater 13, to which steam the cooling steam is fed, upstream of the low-pressure turbine 29 of the steam turbine 27, via a common line 36 and a regulating valve 37. An additional valve 39 can be installed in the steam supply line 38, for the purpose of pressure-matching.

Before the cooling steam enters the high-pressure side of the turbine 3, via the cooling steam line 20, a portion of the cooling steam is led away, via a branch line 21, in order to cool the blading and the rotor of the turbine 3, while the other portion is directed to cool the blades and the stator of the turbine 3. After having flowed through, and cooled the blades, the rotor, and the stator, the steam, which is now strongly overheated, enters, via the lines 40, 41 and the common line 36, the steam supply line 38, which leads into an intermediate stage of the steam turbine 27. The fall in temperature between the intermediate superheater steam from the intermediate superheater 13 and the cooling steam is compensated by the heating of the cooling steam in the turbine 3.

Figure 2:
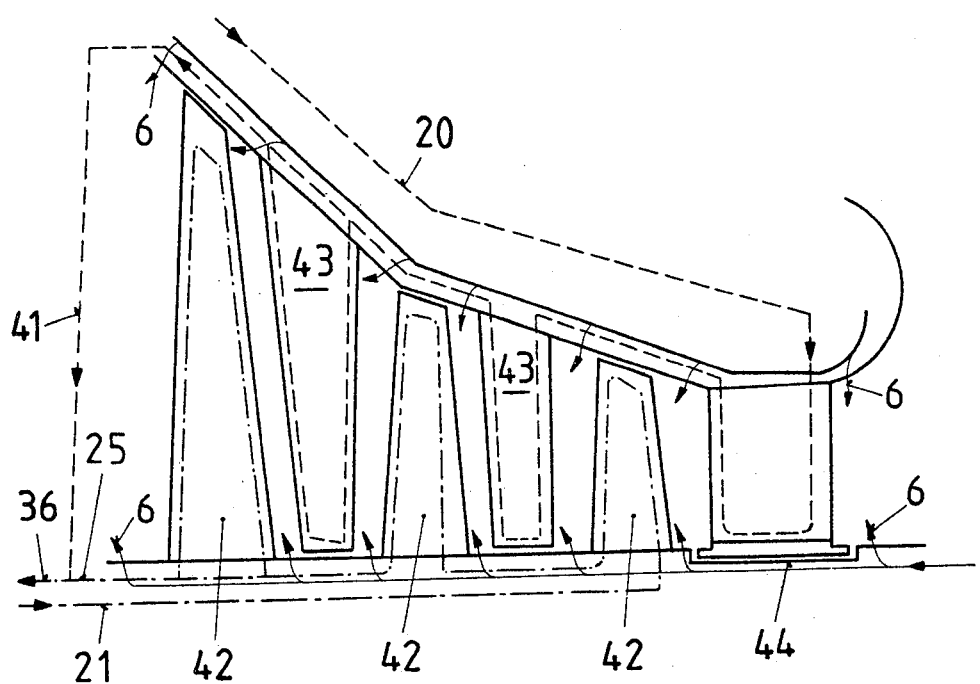
FIG. 2 shows a diagram of the steam and barrier air passages in the gas turbine.

The routeing of the two streams of cooling steam is marked in FIG. 2, namely the routeing of the steam for cooling the rotor, marked with dash-dotted lines, and of the steam for cooling the stator, marked with dashed lines, and the routeing of the barrier air, marked with a continuous line. The barrier air is bled off in the compressor 1, from a point at which an appropriate pressure prevails, and is fed to the turbine 3 via a barrier-air line 5 (FIG. 1). The cooling steam for the rotor blades 42, and for the rotor, enters the turbine via the branch line 21, and the cooling steam for the guide vanes 43, and for the stator, enters the turbine via the line 20. Concurrently with the steam flows 20, 21, barrier air is fed, in a known manner, according to the arrows 6, into air passages 44 from the inlet side of the turbine, these passages being separate from the steam flows 20, 21, and this air is then led away into the flow duct. After flowing through, and cooling, the turbine 3, the steam for cooling the inlet vanes 43 and the stator is led away via the line 41, and the steam for cooling the rotor blades 42 and the rotor is led away via the line 40.

Figure 3:
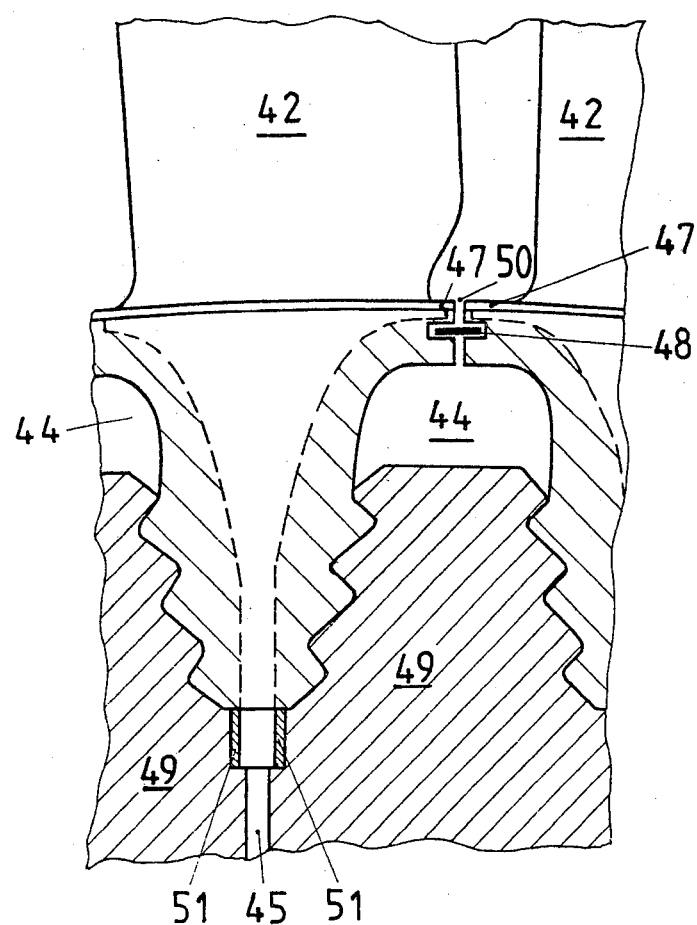
FIG. 3 shows a partial cross-section through a portion of a rotor, in the plane of a row of rotor blades with air passages and steam passages.
Figure 4:
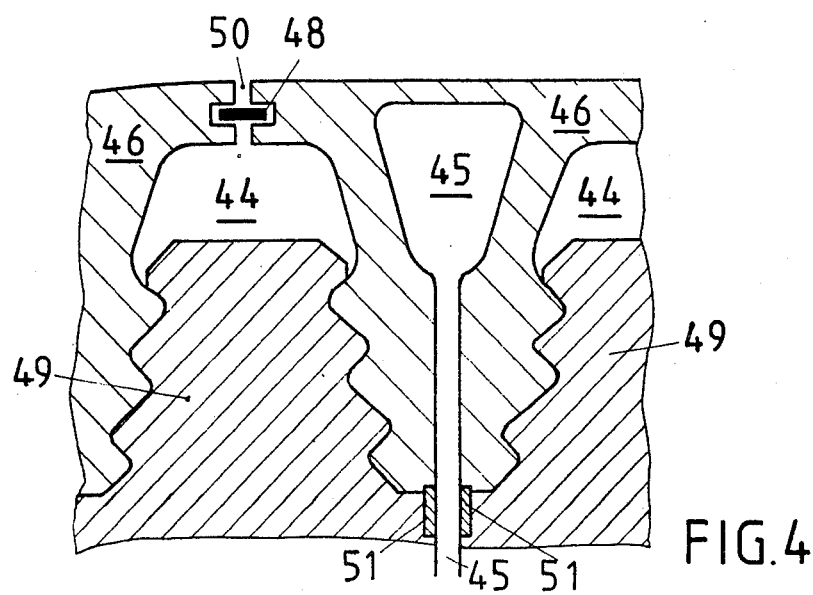
FIG. 4 shows a partial cross-section through a portion of a rotor, with steam passages which are arranged between two thermal-barrier segments.

As illustrated in FIGS. 3 and 4, the hollow rotor blades 42 and the thermal-barrier segments 46 are anchored in the rotor 49. Steam passages 45 lead to the hollow blade-roots, and to the thermal-barrier segments 46, which are located between the individual rows of blades (FIG. 4). The air passages 44 are arranged separately from the steam passages. Sealing strips 48 are fitted between successively adjacent rotorblade rootplates 47. As a result of the slight overpressure prevailing in the air passages 44, leakage-air can flow, through air outlets 50, into the hot-gas duct of the turbine, at a low flow-rate, and thereby generate the barrier effect. Sealing elements 51 are fitted between the rotor 49 and the steam passages 45. The inlet vanes, which are not shown, are cooled in the same manner.

As a result of the steam-cooling of the gas turbine, according to the invention, and as described above, the resulting thermal efficiency of the combined plant is significantly higher than that of plants in which the gas turbine is cooled by air alone. In addition, the multi-pressure boiler enables a pressure to be selected, for cooling the gas turbine, which is significantly lower than the pressure at which the live steam is supplied to the steam turbine. At the same time, the gas turbine serves as an intermediate superheater, and the steam, superheated in the intermediate superheater stage 13, can be mixed with the cooling steam which has passed through the gas turbine, and can then be fed to the low-pressure steam turbine 29.

I claim:

1. Combined gas turbine and steam turbine power station with steam-cooled gas turbine components, in which power station the cooling steam is generated outside the gas turbine (1, 2, 3), in a waste heat boiler (7), and wherein the following features are combined:
   (a) the waste heat from the gas turbine is utilized in a two-pressure waste heat boiler (7), which comprises a low-pressure section (7") and a high-pressure section (7');
   (b) the steam which is generated in the low-pressure evaporator (9) of the waste heat boiler (7), is slightly superheated in a cooling-steam superheater (10), which is located, on the exhaust gas side, between the intermediate superheater (13) and the low-pressure evaporator (9);
   (c) this cooling steam is forcibly led, on the one hand, in the gas turbine casing and hollow inlet vanes (43) and, on the other hand and separated therefrom, in the rotor (49) and hollow rotor blades (42), this steam cooling the components through which it flows, and being strongly superheated on being bled off;
   (d) the steam, which is partially expanded in the high-pressure section (26) of the steam turbine (27), is heated up, in the waste heat boiler (7), in an intermediate superheater (13) which is located, on the exhaust gas side, between the high-pressure preheater (11) and the cooling steam superheater (10), and is led, together with the steam which has been bled from the gas turbine (3), into the correspondingly enlarged low-pressure section of the steam turbine (27) in order to be further expanded.

2. Combined gas turbine and steam turbine power station as claimed in claim 2, wherein at least 40% of the total quantity of working substance is used for cooling purposes.

3. Combined gas turbine and steam turbine power station as claimed in claim 1, wherein barrier air from the compressor (1) is fed, parallel to the cooling steam for the gas turbine (3), into the inlet vanes (43) and into the rotor blades (42), via passages (44) at the inlet side of the gas turbine, which are separated from the steam flow, and via the casing and the rotor.

4. Combined gas turbine and steam turbine power station as claimed in claim 3, wherein steam passages (45) and air passages (44) are located in the rotor (49) of the gas turbine (3).

5. Combined gas turbine and steam turbine power station as claimed in claim 3, wherein steam passages (45) and air passages (44) are located in the stator of the gas turbine (3).

6. Combined gas turbine and steam turbine power station as claimed in claim 4 or 5, wherein the steam passages (45) and the air passages (44) pass through the roots of the stator vanes (43) and through the roots of the rotor blades (42), as well as passing between the thermal-barrier segments (46) which are located between the individual rows of blades.

* * * * *